Figure 1:
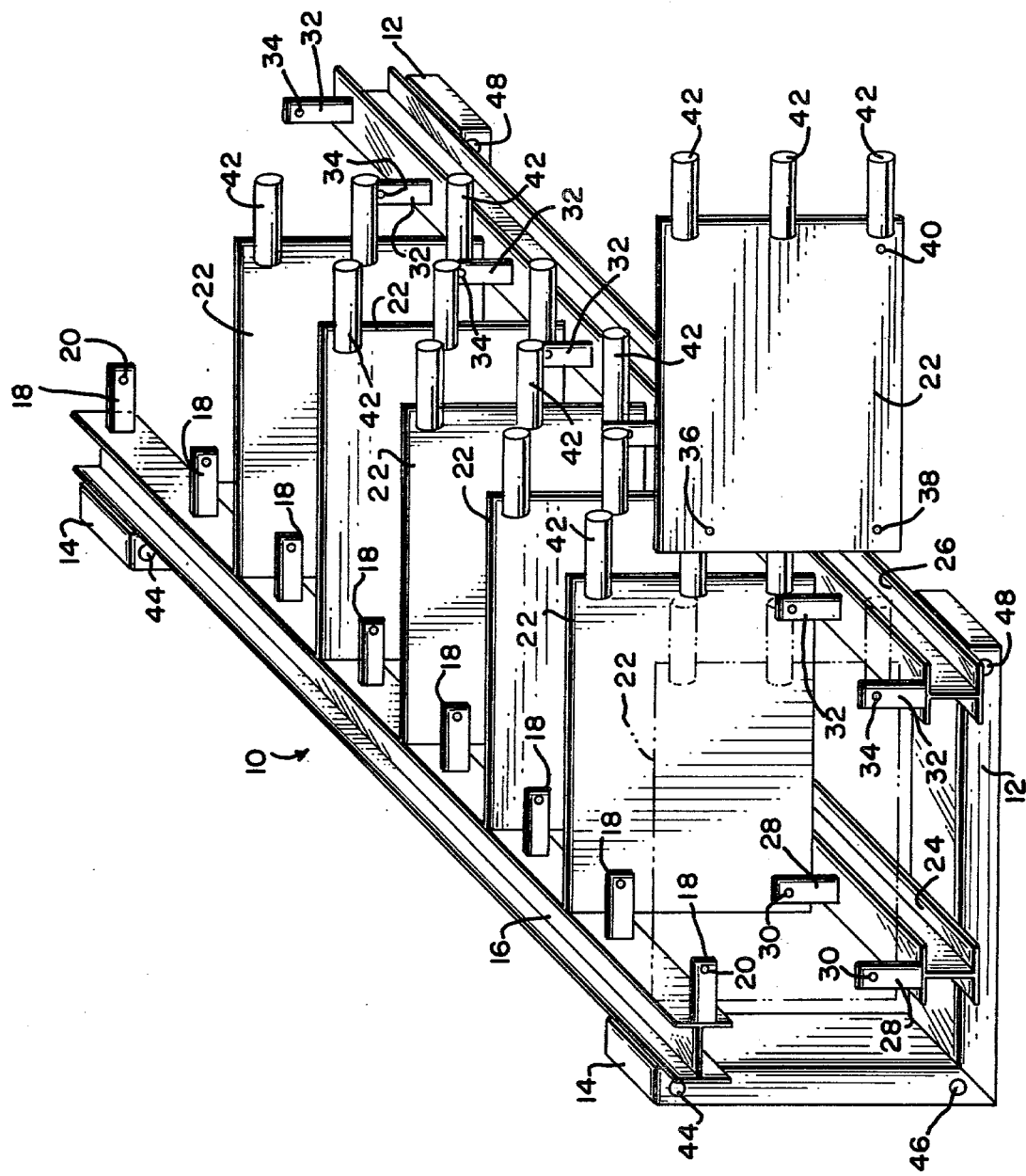

United States Patent [19]

Williams et al.

[11] 4,194,671
[45] Mar. 25, 1980

[54] METHOD FOR CONSTRUCTING A STEAM CONDENSER

[75] Inventors: George J. Williams, Chalfont; Robert C. Boyer, Bethlehem, both of Pa.

[73] Assignee: Ecolaire Incorporated, Malvern, Pa.

[21] Appl. No.: 913,140

[22] Filed: Jun. 6, 1978

Related U.S. Application Data

[62] Division of Ser. No. 789,921, Apr. 22, 1977, Pat. No. 4,131,270.

[51] Int. Cl.² .............. B23P 15/26; B23K 31/02
[52] U.S. Cl. .................... 228/183; 228/212; 29/157.3 R; 29/467; 29/469
[58] Field of Search ............ 228/183, 212, 213; 29/157.3 R, 157.3 D, 157.3 C, 157.4, 430, 467, 469, 726, 727, 730

[56] References Cited

U.S. PATENT DOCUMENTS

| | | | |
|---|---|---|---|
| 2,489,889 | 11/1949 | Huber | 29/726 |
| 2,664,842 | 1/1954 | Lormor | 29/730 |
| 3,644,976 | 2/1972 | Roberts | 29/469 X |
| 3,751,783 | 8/1973 | Roberts et al. | 29/469 X |

*Primary Examiner*—Francis S. Husar
*Assistant Examiner*—K. J. Ramsey
*Attorney, Agent, or Firm*—Seidel, Gonda, Goldhammer & Panitch

[57] ABSTRACT

An L-shaped member is used for positioning a plurality of tube support plates at predetermined spaced locations on the L-shaped member with the tube holes of the support plates aligned. The L-shaped member is portable and includes a plurality of longitudinally separated members for locating the tube support plates with a predetermined spacing between each tube support plate.

5 Claims, 8 Drawing Figures

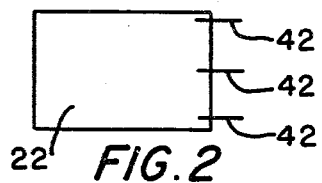
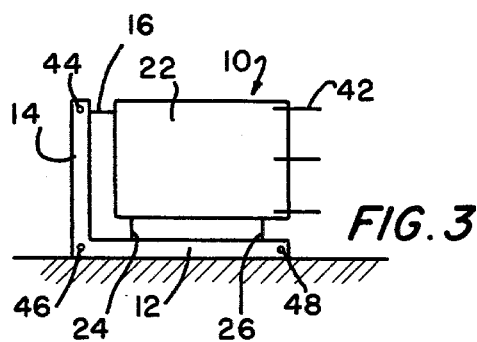
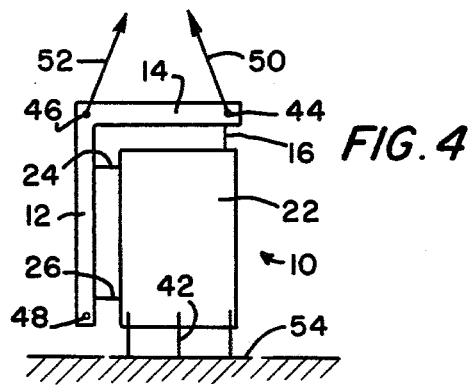
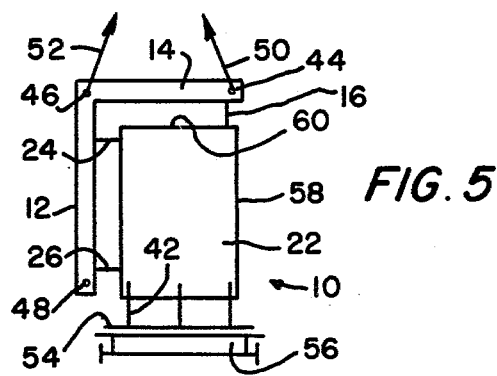
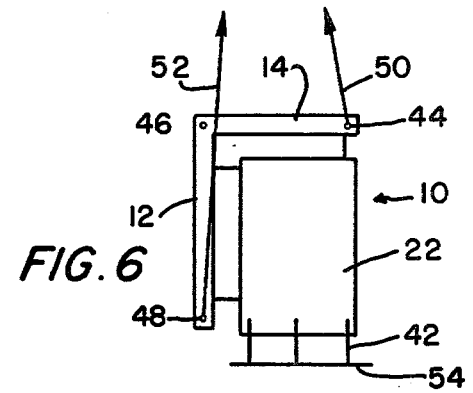
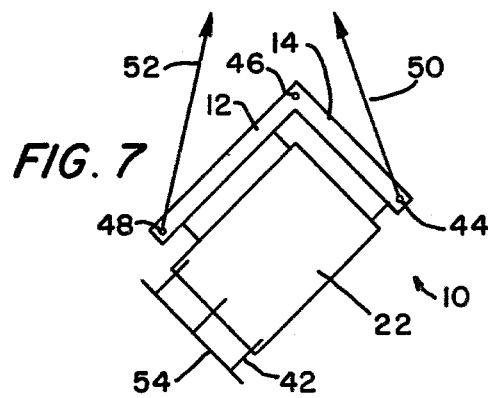
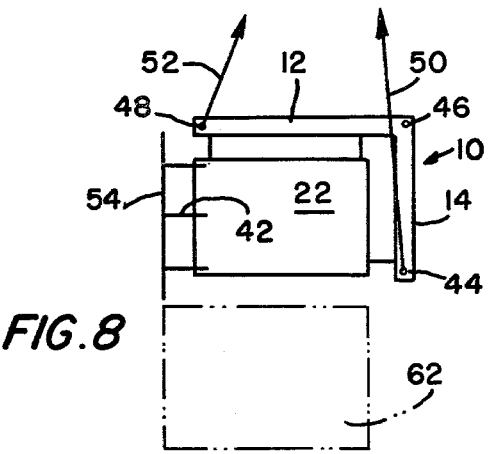

METHOD FOR CONSTRUCTING A STEAM CONDENSER

This application is a division of application Ser. No. 789,921 filed Apr. 22, 1977 for Method And Apparatus For Constructing A Steam Condenser, now U.S. Pat. No. 4,131,270, issued Dec. 26, 1978.

This invention relates to surface steam condensers. More particularly, this invention is a new method for constructing a surface steam condenser.

Larger and larger surface steam condensers are being built. It is not unusual for such a condenser to be, say, 50 or 60 feet long, 25 to 30 feet wide, and over 50 feet high. The condenser may weigh 50 tons or more.

In the past, shipped shell sections have been fitted with lifting lugs to facilitate the transfer of the condenser shell section from the rail car or truck to the location where the condenser is to be assembled for alignment and field assembly. Shipping clearances may prohibit the shipment of the shell section in its final assembled orientation. When this "out of phase" orientation situation is encountered (usually 90°), the shell must be rotated into its proper position. The orientation of the shell requires additional cranes, winches, and hooks to lift the shell section, rotate it, and lower it into its proper orientation. This method places the unprotected parts of shell section in a position during the lifting and rotating maneuvers which could very easily result in damage to the critical parts of the shell section.

With this new method, the above described procedures can be accomplished with only two winches, and the lifting and rotating maneuvers are accomplished without additional cranes, winches, or hooks.

Briefly described, the invention comprises a method which uses a long, portable, generally L-shaped member. A plurality of longitudinally separated members on the L-shaped member locate tube support plates longitudinally with a predetermined spacing between the tube support plates. The L-shaped member encompasses and protects the critical areas of the shell section and minimizes the possibility of damage to the shell section structural components and tubes in preparation for the shipment of the shell section, and during the assembly of the shell section to other shell sections.

The condenser shell section may be formed by locating a plurality of tube support plates at predetermined spaced locations on the L-shaped member. Predetermined holes in each tube support plate are lined up by certain structure of the L-shaped member thereby lining up the tube holes of all of the tube support plates. A condenser side plate is then attached to the tube support plates.

After the condenser shell section has been formed and placed on the shipping means, such as a rail car or truck, the L-shaped member is removed and the shell section shipped to the assembly location. At the assembly location, the L-shaped member is used to lift the condenser shell section from the railway car or truck and place the shell section into the final aligned position for coupling to other condenser shell sections. If necessary, the L-shaped member is adapted to rotate the condenser shell section from the shipping position to the final assembly position.

The invention, as well as its many advantages, will be further understood by reference to the following detailed description and drawings in which:

FIG. 1 is a perspective view of a preferred embodiment of L-shaped member illustrating the manner in which the tube support plates are placed in the L-shaped member and located predetermined distances apart;

FIGS. 2 through 5, inclusive, are schematic drawings illustrating making of the shell section and the placing of the shell section on a railway car for shipment to the assembly site; and FIGS. 6 through 8 are schematic representations illustrating sequentially the removal of the condenser shell section from the railway car and the placing of said shell section in the assembly position.

In the various Figures, like parts are referred to by like numbers.

Referring to the drawings and more particularly to FIG. 1, the new apparatus includes a long, portable, generally L-shaped member 10. Legs 12 of the L-shaped member are longer than legs 14. A long I-beam 16 is attached to the legs 14 adjacent to the outer ends of the legs 14. A plurality of support plate separators 18 each having a bolt hole 20 are longitudinally separated along the I-beam 16. The separators 18 extend perpendicularly from the legs 14 and are longitudinally spaced the proper distances to properly locate the tube support plates 22 along the L-shaped member 10.

A pair of laterally separated I-beams 24 and 26 are mounted on the legs 12. Tube support plate separators 28 are located on the I-beam 24 and extend perpendicularly from the leg 12. Bolt holes 30 are located in each of the support plate separators 28. Support plate separators 32 extend perpendicularly from I-beam 26. Each tube support plate separator 32 has a bolt hole 34. Thus, one set of longitudinally spaced separators 18 is provided on shorter leg 14 and two laterally spaced sets of separators, 28 and 32 are provided on longer leg 12. Each separator 18 is vertically aligned with a corresponding separator 28 and a corresponding separator 32.

As is well known to those killed in the art, the tube support plates 22 are provided with a plurality of holes for receiving and supporting condenser tubes. The holes form all sorts of different patterns, depending upon the specifications of the surface condenser. The particular hole pattern for the tubes does not form part of this invention and, therefore, the tube holes are not shown.

However, the tube support plates 22 each are provided with three locating holes 36, 38, and 40. The locating holes are aligned with the holes 20, 30, and 34, respectively, of locating members 18, 28, and 32, respectively, and bolted in position. The tube support plates 22 are thereby aligned so that all of the tube holes in all of the tube support plates are properly aligned for the insertion of the tubes. The tubes may be inserted in the tube support plates before the condenser shell section is shipped to the assembly location, or, if desired, the condenser shell section may be shipped to the assembly location without the tubes inserted, and the tubes inserted at the assembly location.

Each tube support plate 22 is provided with a plurality of vertically separated pins 42. The condenser side plate (not shown in FIG. 1) is welded to the pins 42 of all of the support plates 22.

Legs 14 are provided with cable receiving bores 44 and 46. Legs 12 are provided with cable receiving bores 48.

FIG. 2 illustrates schematically a tube support plate 22 with the pins 42 and FIG. 3 illustrates schematically the locating of the support plates 22 on the L-shaped member 10 in one of the manufacturing positions. After the condenser shell section has been completed, the L-shaped member 10 is lifted and turned 90° by means of a crane to which cables 50 and 52 are attached and the condenser shell section is placed on the condenser shell side plate 54, as shown in FIG. 4, for welding of the support plates to the side plate 54. This permits the welding to be done "downhand" which is the simplest and most reliable welding position. Additional turning or manipulating can be done with the L-shaped member to complete the welding of the components.

As shown in FIG. 5 the completed condenser shell section can be located on a rail car 56 by means of the L-shaped member 10.

After the condenser shell section is located on the rail car 56, the L-shaped member 10 is removed and the shell section is shipped the assembly location. The center of gravity of the L-shaped member 10 is situated such that the L-shaped member rotates and clears the shell section when it is disconnected and lifted away. As can be seen by reference to FIG. 5, the shipment orientation of the condenser shell section is often such that the long side 58 of each support plate 22 is vertical and the short side 60 is horizontal. Generally, however, at the building site the condenser shell section must be turned about 90° in order to be placed in the proper orientation for assembly at the building site.

FIGS. 6 through 8 illustrate schematically the manner in which the L-shaped member is used to lift the condenser shell section from the shipping position, rotate the shell section for proper orientation for assembly, and the assembly of the shell section in alignment with other condenser shell sections.

FIG. 6 illustrates schematically the lifting of the condenser shell section from a truck or rail car and a transporting of the condenser shell section to a designated area where the condenser is being erected. FIG. 7 illustrates that the condenser shell section can be turned 90° to the desired orientation for assembly and welding of the condenser shell section to adjacent condenser shell sections. FIG. 8 illustrates the aligning of th newly arrived shell section, indicated generally by the number 10, with a previously located condenser shell section 62, indicated by broken lines. The condener side plate 54 may then be welded to the adjacent condenser shell section 62.

The various condenser shell sections can be assembled by repeating the above steps using the L-shaped member until the surface condenser is completed.

The present invention may be embodied in other specific forms without departing from the spirit or essential attributes thereof and, accordingly, reference should be made to the appended claims, rather than to the foregoing specification as indicating the scope of the invention.

We claim:

1. A method of assembling a condenser comprising the steps of
   (a) providing an elongated rigid L-shaped member having sets of aligned locating members at spaced locations therealong with each leg of the L-shaped member having at least one locating member of each set thereon,
   (b) attaching a discrete perforated tube support plate to each set of locating members so that corresponding tube holes in the support plates are aligned,
   (c) attaching a side plate to each of said tube support plates while the support plates are above the side plate and supported by said L-shaped member,
   (d) supporting said condenser section by said L-shaped member from above with the side plate vertically disposed while joining said side plate to a mating side plate of another condenser section, and
   (e) disconnecting said L-shaped member from said support plates after said condenser sections have been joined together.

2. A method in accordance with claim 1 wherein step (c) includes welding the tube support plates to the side plate while the side plate is horizontally disposed below the tube support plates, and using said L-shaped member to rotate said tube support plates 90° after step (b) and prior to commencement with step (c).

3. A method of assembling a condenser comprising the steps of:
   (a) providing an elongated rigid L-shaped member having sets of aligned locating members at spaced locations therealong with each leg of the L-shaped member having at least one locating member of each set thereon,
   (b) constructing a condenser section on a horizontally disposed leg of said L-shaped member including attaching a discrete perforated tube support plate to each set of locating members so that corresponding tube holes in the plates are aligned,
   (c) attaching a side plate to each of said tube support plates while the support plates are above the side plate and supported by said L-shaped member,
   (d) supporting said condenser section from above with the side plate being aligned with a side plate on a mating condenser section, joining the side plates,
   (e) inserting tubes through the aligned holes in said plates.

4. A method of assembling a condenser comprising the steps of:
   (a) providing an elongated rigid L-shaped member having sets of aligned locating members at spaced locations therealong with each leg of the L- shaped member having at least one locating member of each set theron,
   (b) constructing a condenser section on a horizontally disposed portion of said L-shaped member including attaching a discrete tube support to each set of locating members so that corresponding tube guide holes in the tube supports are aligned,
   (c) attaching a side plate to each of said tube supports while the tube supports are supported by said L-shaped member,
   (d) supporting the thusly constructed condenser section from above while joining said side plate to a mating side plate of another condenser section, and
   (e) inserting tubes through the sets of aligned guide holes.

5. A method in accordance with claim 4 including joining said side plates by welding the same at a location remote from the location where the condenser section was constructed, and shipping the condenser section from the location of construction to the location at which the side plates are welded.

* * * * *